G. P. HERRICK.
PACKING MEANS.
APPLICATION FILED MAR. 13, 1912.

1,048,693.

Patented Dec. 31, 1912.
2 SHEETS—SHEET 2.

Witnesses:

Inventor
Gerardus Post Herrick
By his Attorneys
Gifford & Bull

UNITED STATES PATENT OFFICE.

GERARDUS POST HERRICK, OF NEW YORK, N. Y.

PACKING MEANS.

1,048,693.  Specification of Letters Patent.  Patented Dec. 31, 1912.

Application filed March 13, 1912. Serial No. 683,481.

*To all whom it may concern:*

Be it known that I, GERARDUS POST HERRICK, a citizen of the United States, residing at New York city, borough of Manhattan, in the county of New York and State of New York, have invented certain new and useful Improvements in Packing Means for Use in Connection with Relatively Movable Parts of Engines, Pumps, or Any other Apparatus or Machinery, of which the following is a specification.

My invention relates to new and useful improvements in packing means for use in connection with relatively movable parts of engines, pumps, or any other apparatus or machinery wherein is present a fluid, such as a liquid, or gas, and particularly contemplates a packing for use in connection with the shaft of a rotary mechanism using a pressure or a combustible charge, and fluid pumps.

The primary object of the invention is to provide an adjustable packing adapted to be arranged between parts having a relative movement, and be carried by one of the same to move in proximity or contact with the other part, and which is capable of manual adjustment so as to regulate the degree of contact between the parts, with simple and effective means whereby the packing may be adjusted without altering or removing the parts with which it is associated.

The invention consists in the improved construction of parts and their arrangement in operative combination to be fully set forth hereinafter, and the novelty of which will be particularly pointed out and distinctly claimed.

I have fully and clearly illustrated my invention in the accompanying drawings, to be taken as a part of this specification, and wherein—

Figure 1:
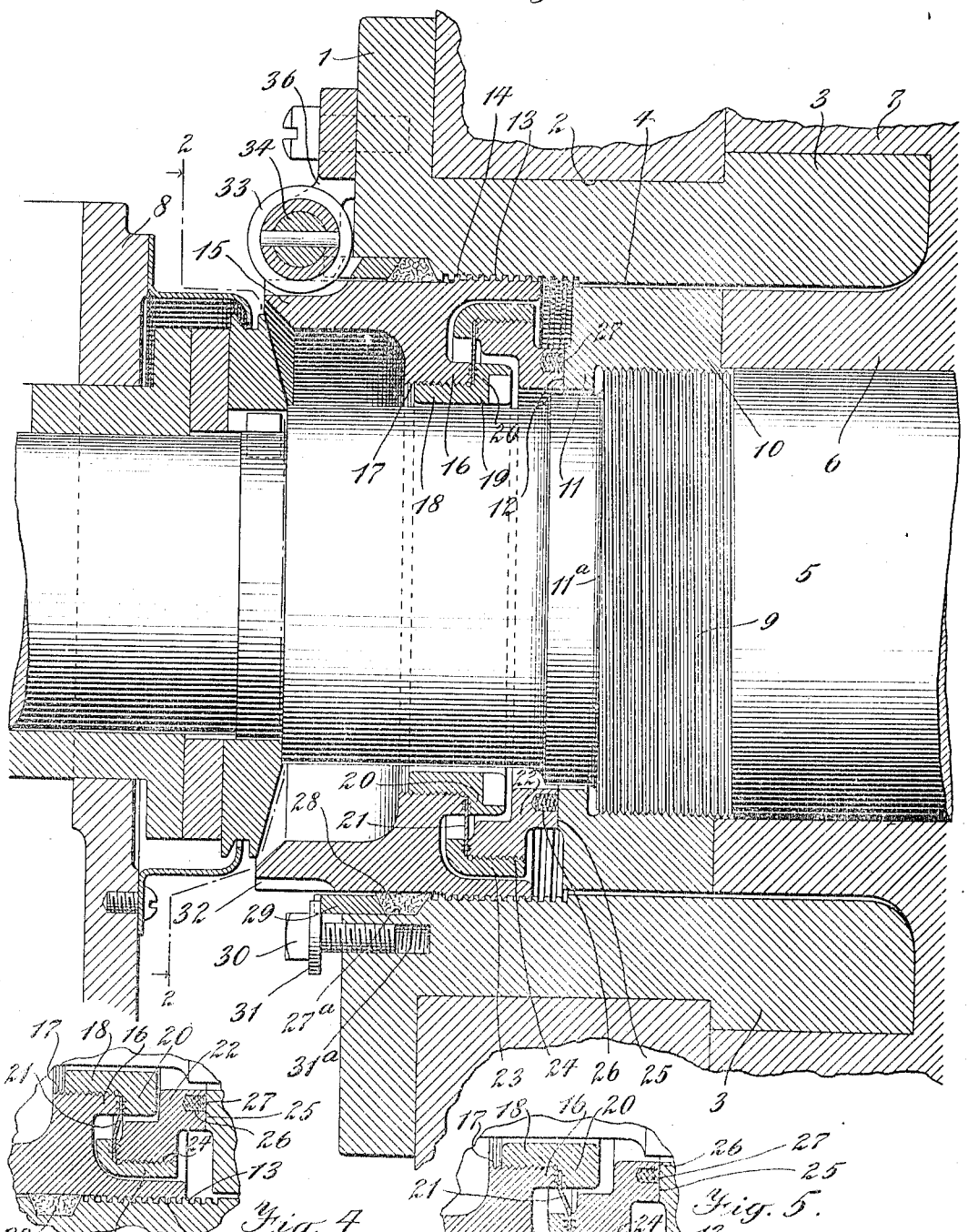
Figure 2:
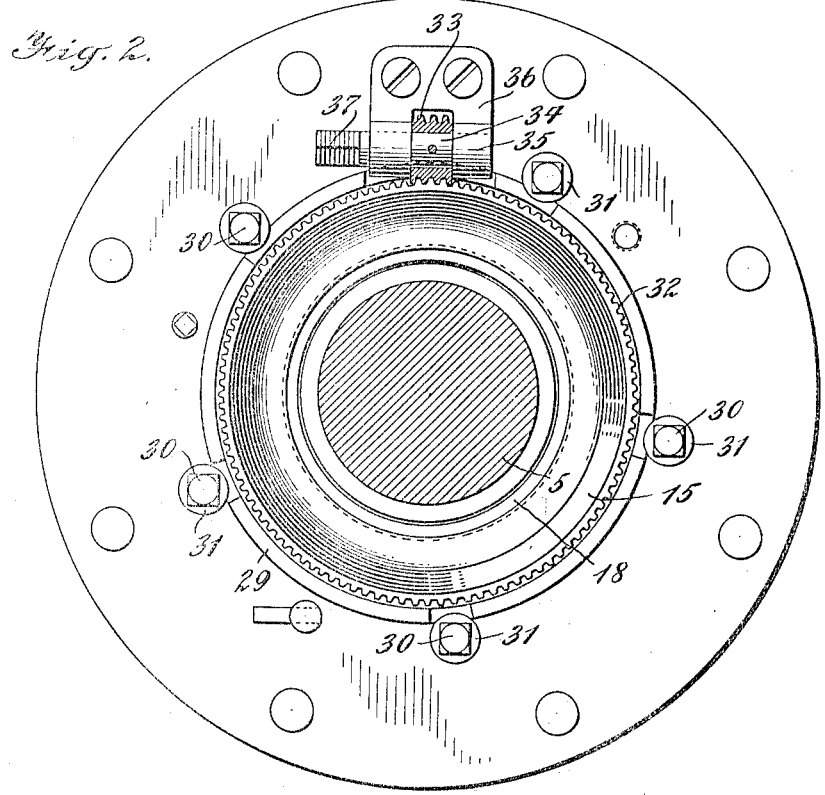
Figure 3:
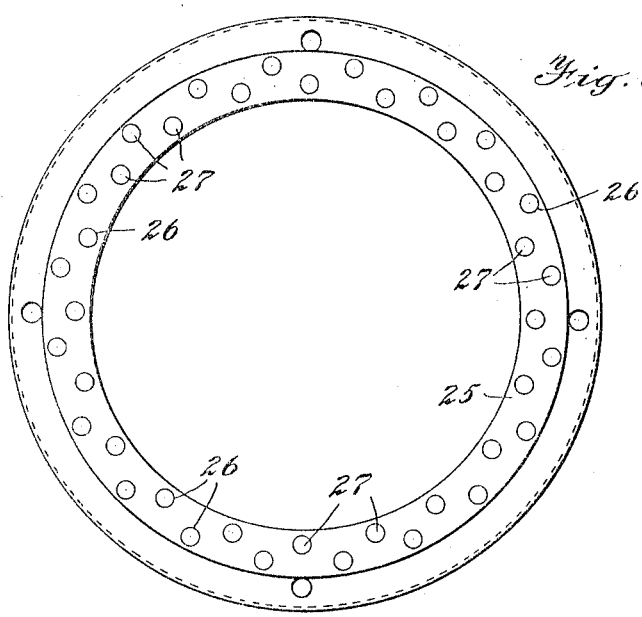

Figure 1 is a longitudinal section through a portion of the casing and rotor of a rotary engine, showing the shaft bearings, the main shaft for the rotor, and my improved packing located between a portion of the casing and the shaft to prevent leakage between the shaft and casing; Fig. 2 is a section on the line 2—2 of Fig. 1; Fig. 3 is a face view of a packing ring forming part of my invention; Fig. 4 is a detailed sectional view of the parts adjusted to increase the degree of contact between the contacting parts; Fig. 5 is a similar view showing the parts in the position to provide a less degree of contact than that shown by the parts as adjusted in Fig. 2.

Referring to the drawings by characters of reference, in Fig. 1, 1 designates a portion of the casing of a rotary engine, said casing having an opening 2 through which extends an annular plug 3 formed with a central opening 4 as shown. Extending through the opening in the plug is the rotor shaft 5, upon which is mounted the hub 6 of the rotor 7, the outer end of the shaft being journaled in a bearing 8, exterior to the casing.

At a point adjacent the hub of the rotor the shaft has a shoulder and is threaded as at 9, and engaging this thread and surrounding the shaft is a collar 10 provided with an inwardly projecting annular flange 11 overhanging the shoulder 11$^a$ of the shaft and closely approaching the surface of the shaft but spaced therefrom as clearly shown in Fig. 1 of the drawings. This collar is provided on its outer side, or the side away from the hub of the rotor, with an annular running or bearing surface 12 which may be arranged in a plane at right angles to the axis of the rotation of the shaft, with which surface the packing, which I will now describe, coöperates to prevent or reduce leakage.

The outer portion of the bore of the annular plug is internally threaded as at 13 to receive threads 14 on an annular nut member or adjustable carrying ring 15, which surrounds the shaft, and the inner diameter of which is shown out of contact with the shaft, the threaded connection between said nut member and the plug providing for the adjustment of said member longitudinally of the shaft toward and away from the rotor. At its inner end or face the member 15 is provided with an annular flange or shoulder 16, and is formed with an internally threaded seat as at 17, said seat being adapted to receive a threaded portion 18 of a clamping nut 19, the latter having an overhanging shoulder 20 between which and the flange 16 is clamped an imperforate, flexible, annular diaphragm 21, preferably of brass or steel. Carried by the outer edge of this annular flexible, resilient diaphragm is a contact ring 22, which is clamped to said diaphragm by a clamping ring 23, which is threaded onto said contact ring as at 24, and between which clamping ring and contact ring the outer edge of the diaphragm 21 is received and clamped. The contact ring is provided with a face 25 adapted to contact and cooperate with the annular running or bearing surface carried by the shaft 5, heretofore described, so as to prevent leakage between the shaft and the casing. This contact ring 22 is preferably made of cast iron or a bearing metal and is preferably provided at its contact or wearing surface 25 with a plurality of circumferentially arranged recesses 26 to receive inserts 27 of graphite or other suitable lubricating material, the outer ends of which plugs are adapted to contact with the running or bearing surface 12 carried by the shaft.

In order to reduce or prevent accidental leakage between the adjusting member or nut 15 and the plug 23, I provide a shouldered packing channel 27ª in the plug surrounding the adjusting member, which channel is adapted to receive suitable packing 28 which is compressed to the desired degree by a packing ring 29, which is thrust inward and held in place by means of clamping screws 30 having flanges 31 overhanging the outer face of said ring 29. These clamping screws are threaded into sockets 31ª in the end of the plug 3. It will be seen that upon screwing the screws into said sockets the ring will be forced into the channel 27 into engagement with the packing therein.

During the normal operation of the engine, if the packing be employed in connection with an engine, the leakage between the rotor and the plug passes into the space within the plug surrounding the threaded portion of the shaft. The shaft nut 10, the clamping ring 23, the diaphragm held by said ring and the nut 21, the contact member 22 carried by the diaphragm, and all of the parts described being imperforate, the only point at which the fluid pressure might find escape between the shaft and the packing is at the point of contact between the surface 25 of the packing and the surface 12 of the shaft or shaft nut and the said contact ring 22 can be adjusted so that the leakage at this point will either be prevented altogether or reduced to the desired degree. In any design of the diaphragm and the parts carried thereby, the combined area of one end of the clamping ring 23, and contact ring 22, exposed to steam pressure away from the rotor (this does not include the surface 25 which is not exposed to axial pressure when normally in contact with surface 12) is so proportioned relative to the combined area of the face of the diaphragm 21 and the other end of said clamping ring 23, toward the rotor, that the difference in pressure load is substantially equal to the difference in leverage at which the two pressures, in opposite directions, are applied to the diaphragm so that the packing may be substantially balanced. Under the conditions just stated; i. e., when the packing is balanced, the pressure of surface 25 toward surface 12 is under control of the adjustable carrying ring 15, and the tension in the diaphragm set up by its adjustment toward or away from the rotor.

If for any reason the diaphragm and packing element should be subjected on their opposite faces to pressures which differ tending to either move the diaphragm and the packing element toward or away from the face 12, the tension of the diaphragm may be altered to either augment or detract from the pressure force so as to determine the position of the packing element and the degree of contact which it may have with the face 12. For instance, if the parts of the packing toward the rotor should be exposed to a pressure sufficient to reduce the degree of contact below the desired point, the nut 15 may be screwed into the casing so as to increase the diaphragm tension to sufficiently overcome the pressure tending to move the packing element away from the face 12, until said packing element maintains the desired contact with said face. If the opposite pressure effect should be present; that is, tending to move the diaphragm and packing element toward the face 12, then the nut may be operated to withdraw the packing until the diaphragm tension will oppose the steam pressure to such an extent that the force exerted by the steam pressure will be opposed by a diaphragm tension so that the difference of the said forces will be just sufficient to secure the desired contact. I am therefore able to obtain the desired contact by means of this manual adjustment irrespective of fluid pressure forces at the packing. I am also able by adjustment to obtain exactly the desired contact irrespective of the axial position of the shaft relative to the casing. The manual adjustment also provides efficient means for adjusting the packing ring to take up wear between the engaging faces.

As heretofore described, the nut 15 is adjustable in the opening of the plug longitudinally of the shaft and this arrangement is provided in order that the degree of contact, or the amount of clearance between the contact ring bearing surface 25 and the shaft nut bearing surface 12, may be regulated.

As shown in Fig. 1 of the drawings the diaphragm is in its relaxed position at right angles to the axis of rotation so that by its own resiliency it does not urge the contact ring toward or away from the shaft nut, said contact ring being urged toward or away from said shaft nut by the accidental difference in the balance of the steam pressure alone. After the adjusting nut 15 is moved inward so that the diaphragm assumes the position shown in Fig. 4, then it will be seen that the contact ring is urged toward the shaft nut, by the inherent resiliency of the diaphragm tending to urge the surface 25 toward its normal position of contact to increase the degree of contact. Should the adjusting nut be moved outward from normal position shown in Fig. 1 the tension of the diaphragm would be relaxed and a lighter contact would be maintained than in the condition heretofore described.

In the design of the shaft nut and contact face I preferably arrange the contacting surfaces as close to the shaft as possible in order that a compact construction reducing friction loss is provided and so that said members may be spaced to provide a surface on the contact ring to be subjected to the steam pressure.

Suitable means is provided for manually adjusting the adjusting member in both directions longitudinally of the shaft either to increase or decrease the degree of engagement between the packing ring 22 and the shoulder 12 on the shaft. This means may take a number of forms, but I prefer to provide the outer projecting end of the adjusting member 15 with gear teeth 32 with which meshes a worm gear 33 pinned to a shaft 34 mounted in suitable bearings 35 on a bracket 36 fixed to the end of the plug. The end of the shaft 34 is extended as at 37 and formed with annularly disposed faces so that it may be conveniently engaged by a wrench. It will be seen that by rotating the shaft 34 and the worm thereon that the adjusting member 15 will be rotated and thereby moved longitudinally of the shaft in one direction or the other according to the direction in which the shaft 34 is rotated. By this arrangement I am able to provide means whereby the packing ring 23 may be adjusted with extreme ease and nicety in order to have the desired clearance or contact between the faces 12 and 25, and whereby, in moving from one point of adjustment to another, the nut 15 moves through all intermediate positions. It will also be seen that the packing can be entirely removed for inspection or repair without disturbing the shaft and may be adjusted while the relatively movable parts are in operation. It will also be seen that by the worm and gear arrangement the adjusting member 15 will be locked in any position to which it may be moved.

While I have shown the inserts as an efficient means for lubricating the contacting faces, I do not desire to limit myself to this particular method of lubrication, as other means may be employed for this purpose without departing from the scope of my invention. I also do not limit myself to the precise arrangement of the packing, or to an arrangement in which it is supported on the casing, as it might be otherwise supported, for instance, on the shaft or rotary member, and still come within my invention.

What I claim and desire to secure by Letters Patent of the United States is:—

1. A structure of the character described comprising members one of which is rotatable relative to the other, a resilient diaphragm connected to one of said members and carrying a packing adapted to contact the other of said members, means whereby the packing is subjected to opposing fluid pressures balancing each other, and means independent of fluid pressure for varying the tension of the diaphragm for regulating the degree of contact between the packing and the part it contacts.

2. In a packing, two elements one of which is rotatable relative to the other, a member threaded on one of said elements, a resilient diaphragm connected to said movable member, a packing member carried by said diaphragm and adapted to contact with the other element, and a worm and gear for rotating said member to cause it to move toward or away from the said other element.

3. In a packing, in combination, two elements, one of which is rotatable relative to the other, a packing member adapted to engage an annular face of one of said elements, lubricant inserts exposed between said packing and said annular face, a flexible resilient diaphragm acting on said packing member, and means for bodily moving said diaphragm relative to said annular face to vary the force of the diaphragm exerted on said packing member.

4. In a packing, in combination, two elements, one of which is rotatable relative to the other, a packing member adapted to engage an annular face of one of said elements, lubricant inserts in said packing member adapted to engage said annular face, a flexible resilient diaphragm acting on said packing member, and means for bodily moving said diaphragm relative to said annular face to vary the force of the diaphragm exerted on said packing member.

5. In a structure of the character described, a casing, a shaft in the casing having an annular face, an annular packing member contacting said face and surrounding but free from the shaft, an annular flexible resilient diaphragm fluid-tight with the casing, and forming the sole support for the said packing member, and means for varying the tension of the diaphragm.

6. In a packing, two elements, one of which is rotatable relative to the other, a packing member engaging an annular face of one of said elements, a resilient diaphragm connected to said packing member, a clamping ring threaded to the other of said elements and between which and said element the diaphragm is clamped, and means for varying the tension of the diaphragm.

7. A structure of the character described comprising members, one of which is rotatable relative to the other, a resilient diaphragm connected to one of said members and carrying a packing element adapted to contact the other of said members, means whereby the packing element is subjected to opposing pressures, and means for varying the tension of the diaphragm so that the diaphragm force will be altered to compensate for variations between said opposing pressure forces and thereby determine the position of said packing element.

8. In a fluid packing, two elements, one of which is movable relative to the other, a packing element between said elements and adapted to rest against one of said elements, said packing element including a resilient diaphragm, with external means for varying the tension on said diaphragm.

9. In a fluid packing, two elements, one of which is movable relative to the other, a packing element between said elements and adapted to rest against one of said elements, said packing element including a resilient diaphragm, with external means for varying the tension on said diaphragm, said diaphragm being joined to the relatively fixed element, and means for removing said packing without disturbing said shaft.

In testimony whereof I have hereunto signed my name in the presence of two subscribing witnesses.

GERARDUS POST HERRICK.

Witnesses:
C. S. HEYLMAN,
ARTHUR GOAT.